Nov. 3, 1953 L. C. HOLMES 2,658,113

MEANS FOR IMPROVING THE PERFORMANCE OF MAGNETIC SOUND RECORDING AND REPRODUCING HEADS

Filed Oct. 3, 1949

INVENTOR.
LYNN C. HOLMES
BY T. L. Bowes
ATTORNEY

Patented Nov. 3, 1953 2,658,113

UNITED STATES PATENT OFFICE 2,658,113

MEANS FOR IMPROVING THE PERFORMANCE OF MAGNETIC SOUND RECORDING AND REPRODUCING HEADS

Lynn C. Holmes, Fairport, N. Y., assignor to Stromberg-Carlson Company, a corporation of New York Application October 3, 1949, Serial No. 119,359

7 Claims. (Cl. 179—100.2)

This invention relates to recording and reproducing heads for use in magnetic sound recording and reproducing systems and more particularly to means for improving the performance of such heads.

Magnetic heads for use in magnetic recording commonly comprise a laminated core. It has proved difficult in the past to assemble the core in such a way as to maintain the desired standard of performance over long periods of time.

It is, therefore, an object of this invention to provide a new and improved magnetic sound recording and reproducing head.

Another object of this invention is to provide a new and improved magnetic sound recording and reproducing head which gives uniform performance over long periods of time.

Still another object of my invention is to provide a new and improved magnetic sound recording and reproducing head which gives improved high frequency response over long periods of time.

In order to accomplish the foregoing objects, I have provided means for positively clamping or otherwise applying pressure sidewise or laterally and also longitudinally or endwise of each of the laminations independently of the lateral pressure. In this way, any tendency of the laminations to shift with respect to each other or the opening up of the laminations at the air gap across one edge thereof, as because of the expansion and contraction of the core, or the container housing the apparatus, for example, is prevented. I find that a high standard of performance is assured initially and more consistent or uniform results are obtained over long periods of time. In the preferred embodiment of my invention, I provide the simultaneous by independent application of both lateral or side and longitudinal or end pressure on substantial portions of the laminations in a magnetic recording and reproducing head.

The features of my invention which I believe to be novel are set forth with particularity in the appended claims. My invention itself, both as to its organization and manner of operation, together with further objects and advantages thereof, may best be understood by reference to the following description taken in connection with the accompanying drawing which illustrates in Fig. 1 a perspective view of the parts comprising a magnetic recording and reproducing head constructed in accordance with the principles of my invention, and Fig. 2 shows a cover member for the parts shown in Fig. 1.

Figure 1:
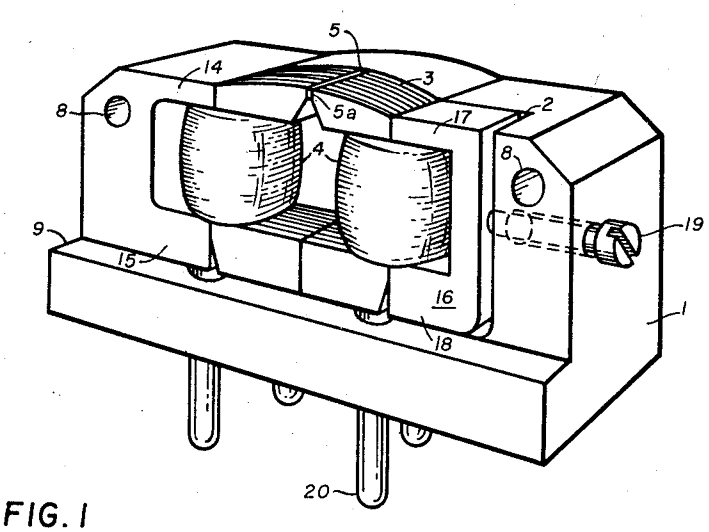
Figure 2:
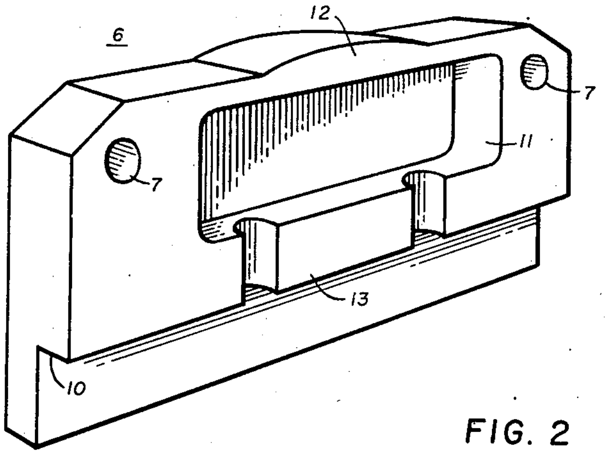

Referring to Fig. 1 of the drawing, there is shown a magnetic head having a body portion 1 of suitable material such as a plastic, for example. The upper part of body portion 1 is recessed as indicated by numeral 2 in order to receive the magnetic assembly comprising laminated core 3 comprising a plurality of laminations of magnetic material and coils 4 shown as being wound about the opposite legs of the core. The laminations are shaped and the recess is arranged to permit the core to rise above the upper edge of the body of the head so that a magnetic medium can be move across a gap 5 of non-magnetic material, including air, and having a permeability of essentially unity, provided across one edge of core 3. According to the drawing, a spacer 5*a* is utilized to define gap 5, but the spacer may be omitted if desired. The body of the magnetic head, in this form of my invention, is completed by cover portion 6 shown in Fig. 2 which is preferably removably secured to body portion 1 by suitable fastening means such as screws (not shown) extending through suitably arranged openings 7 in cover portion 6 into threaded engagement with suitably disposed tapped holes 8 in body portion 1.

In order to assist in the positive location of cover portion 6 with respect to body portion 1 and, more particularly with respect to core 3, as will appear hereinafter, body portion 1 is shouldered as indicated by the numeral 9 and a corresponding shoulder 10 is provided on the inner surface of cover portion 6. Cover portion 6 is also provided on its inner surface with a recess 11 to receive those portions of coils 4 which extend beyond the recess 2 in body portion 1. The upper portion 12 and the lower portion 13 of cover 6 are arranged to engage the laminations of core 3 above and below the coils 4, respectively. Pins 20 provide terminals for electrical connections between coils 4 and any external circuit.

When cover 6 is drawn up tightly against body portion 1, portions 12 and 13 bear against the corresponding portions of the core 3 and clamp the laminations, i. e., apply lateral pressure on the sides or flat faces of the laminations, between corresponding sides of cover 6 and body portion 1.

It is known that magnetic heads provide desirable performance characteristics when an optimum gap is provided. I have found that by supplementing sidewise or lateral pressure by endwise or longitudinal pressure on laminations 3, any desired length of gap can be specified and attained in production quantities on an assembly line and the prescribed gap can be maintained indefinitely.

In the illustrated emobdiment of my invention,

I have provided at one end of recess 2 an inwardly-directed C-shaped configuration including an upper portion 14 and a lower portion 15 so disposed as to engage the upper and lower edges of the laminations at the top and bottom of one end of core 3. In the illustrated embodiment of my invention, portions or arms 14 and 15 are integral with the body portion 1 but, if desired, a separate member having core engaging portions at suitably disposed locations may be employed.

On the other end of the core and within recess 2, I have shown a C-shaped pressure member 16 of suitable material such as brass or a plastic, for example, having arms or portions 17 and 18 oppositely disposed, respectively, to portions 14 and 15. Portions 17 and 18 preferably engage the upper and lower portions of the adjacent ends of the laminations.

Suitable means is provided for engaging the ends of the laminations for applying pressure longitudinally of or clamping the laminations between arms or portions 14 and 17 and also between arms or portions 15 and 18. The illustrated means for accomplishing this function is an adjustable threaded member 19 which extends through a suitable tapped opening in the end wall of body portion 1 into engagement or contact with clamping or pressure member 16.

The above assembly provides lateral as well as longitudinal pressure upon the laminations and thereby directly prevents any longitudinal or lateral displacement of the laminations. By the application of sufficient pressure, however, transverse shifting of laminations and consequent elevation of one side of the air gap with respect to the other side of the gap is minimized.

It is essential that whatever pressure or clamping means is employed is so arranged as to minimize distortion of the laminations. Laminations of the sort involved are normally formed from a high permeability material and, as is well known, the permeability is decreased substantially by distortion. In order to avoid distortion, the clamping or pressure means provided should be such as to produce minimum bending forces. Therefore, the longitudinal pressure members such as portions 14, 15, 17 and 18 preferably have core engaging surfaces which are straight and parallel and the pressure should be applied in the vicinity of the corners of the core. Moreover, the laminations themselves should have sufficient stiffness in the direction of endwise pressure to resist distortion. Similarly, the faces of body 1 and cover 6 engaging the sides of the core should be smooth and parallel.

The shape of the laminations utilized to form the core 3 may be as desired, although laminated structures are preferably assembled from individual laminations which do not provide a complete magnetic path on both sides of the air gap because of the difficulty in assembling coils 4 on the core. Moreover, while such coils may be wound in place, such winding operation tends to complicate the application of pressure after assembly of the head. Therefore, it is preferred to assemble the core in a plurality of portions, add the coils and then complete the magnetic structure as is well known in the art. Either butted or interleaved joints may be employed. If butted joints are provided, pressure on the lower or secondary gap is just as important as the application of pressure to the principal or upper gap.

The material employed for clamping member 16 should be such as will not affect the electrical or magnetic characteristics of the coils 4 or the magnetic circuit. For example, a steel clamping member affects the inductance of coils 4 and the smoothness of the low frequency response. I have found that a suitable plastic material or brass is satisfactory, although losses are slightly increased by the latter.

While I have shown and described a particular embodiment of my invention, it will be obvious to those skilled in the art that changes and modifications may be made without departing from my invention in its broader aspects. For example, the shape of body 1 and recess 2 may be of any desired configuration, clamping or pressure member 16 may be of any desired shape, and one or more clamping members may be used at one or both ends of the core. Moreover, the cover 6 may be located with respect to body portion 1 by means of pins, for example, instead of shoulders 9 and 10. I, therefore, aim in the appended claims to cover all such changes and modifications as fall within the true spirit and scope of my invention.

What I claim is:

1. In a magnetic head, a core comprising a plurality of laminations of magnetic material disposed side by side and provided with a gap extending transversely of said laminations across one edge of said core, and means for maintaining said laminations in predetermined positions in order to obtain uniform performance of said head including means bearing against substantial areas of the ends of each of said laminations for applying longitudinal pressure on each of said laminations.

2. In a magnetic head, a core comprising a plurality of laminations of magnetic material disposed side by side and provided with a gap extending transversely of said laminations across one edge of said core, and means for maintaining said laminations in predetermined positions in order to obtain uniform performance of said head including means bearing against substantial areas of the ends of each of said laminations for simultaneously applying lateral pressure on said core and longitudinal pressure on each of said laminations.

3. In a magnetic head, a core comprising a plurality of laminations of magnetic material disposed side by side and provided with a gap extending transversely of said laminations across one edge of said core, and means for maintaining said laminations in predetermined positions in order to obtain uniform performance of said head including means bearing against the sides of said laminations for applying pressure laterally of said laminations, and means for applying pressure longitudinally of each of said laminations independently of said lateral pressure applying means.

4. A magnetic head comprising a body, a recess in said body, a core comprising laminations of magnetic material disposed in said recess, said core having a gap extending transversely across one edge of said laminations, that portion of said core containing said gap being disposed to permit a magnetic medium to be moved across said gap, the sides of said recess adjacent the sides of said core being arranged to clamp said core therebetween, and the ends of said recess adjacent the ends of said core including means to apply pressure endwise of substantial portions of each of said laminations independently of said lateral pressure applying means, whereby said laminations are maintained in predetermined positions with respect to each other.

5. A magnetic head comprising a body, a recess in said body, a core comprising laminations of magnetic material disposed in said recess, said core having a gap extending transversely across one edge of said laminations, that portion of said core containing said gap being disposed to permit a magnetic medium to be moved across said gap, the sides of said recess adjacent the sides of said core being arranged to clamp said core laterally therebetween, a pressure member disposed between one end of said core and the corresponding end of said recess, and means for clamping each of said laminations longitudinally between said pressure member and the other end of said recess.

6. A magnetic head comprising a body, a recess in said body, a core comprising laminations of magnetic material disposed in said recess, said core having a gap extending transversely across one edge of said laminations, that portion of said core containing said gap being disposed to permit a magnetic medium to be moved across said gap, the sides of said recess adjacent the sides of said core being arranged to clamp said core therebetween, and the ends of said recess adjacent the ends of said core including means to apply pressure endwise of each of said laminations, whereby said laminations are maintained in predetermined positions with respect to each other, said pressure means comprising a rigid non-resilient member disposed between an end of said core and the adjacent end of said recess and means for forcing said member against the ends of said laminations.

7. A magnetic head comprising a body, a recess in said body, a core comprising laminations of magnetic material disposed in said recess, said core having a gap extending transversely across one edge of said laminations, that portion of said core containing said gap being disposed to permit a magnetic medium to be moved across said gap, the sides of said recess adjacent the sides of said core being arranged to clamp said core laterally therebetween, a pressure member disposed between one end of said core and the corresponding end of said recess, and means for clamping each of said laminations longitudinally between said pressure member and the other end of said recess, said clamping means comprising an adjustable member extending through said body in threaded engagement therewith and into contact with said pressure member.

LYNN C. HOLMES.

References Cited in the file of this patent

UNITED STATES PATENTS

| Number | Name | Date |
|---|---|---|
| 2,215,782 | Ellis | Sept. 24, 1940 |
| 2,413,108 | Latchford | Dec. 24, 1946 |
| 2,493,742 | Begun | Jan. 10, 1950 |
| 2,523,576 | Kornei | Sept. 26, 1950 |
| 2,555,110 | Bobb | May 29, 1951 |
| 2,574,707 | Pettus | Nov. 13, 1951 |
| 2,587,097 | Berlant | Feb. 26, 1952 |

FOREIGN PATENTS

| Number | Country | Date |
|---|---|---|
| 725,830 | Germany | Sept. 30, 1942 |